United States Patent
Yokoyama et al.

(10) Patent No.: US 9,194,292 B2
(45) Date of Patent: Nov. 24, 2015

(54) TURBINE HOUSING

(75) Inventors: Takao Yokoyama, Tokyo (JP); Katsuyuki Osako, Tokyo (JP); Yasuaki Jinnai, Tokyo (JP); Noriyuki Hayashi, Tokyo (JP); Motoki Ebisu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 429 days.

(21) Appl. No.: 13/384,913

(22) PCT Filed: Dec. 15, 2010

(86) PCT No.: PCT/JP2010/072584
§ 371 (c)(1),
(2), (4) Date: Feb. 28, 2012

(87) PCT Pub. No.: WO2011/078035
PCT Pub. Date: Jun. 30, 2011

(65) Prior Publication Data
US 2012/0275914 A1 Nov. 1, 2012

(30) Foreign Application Priority Data

Dec. 21, 2009 (JP) .................................. 2009-289414

(51) Int. Cl.
*F01D 1/02* (2006.01)
*F02C 6/12* (2006.01)
(Continued)

(52) U.S. Cl.
CPC . *F02C 6/12* (2013.01); *F01D 9/026* (2013.01); *F01D 17/165* (2013.01); *F01D 25/24* (2013.01); *F05D 2220/40* (2013.01); *F05D 2230/64* (2013.01); *F05D 2260/96* (2013.01)

(58) Field of Classification Search
CPC ..... F04D 29/4226; F02C 6/12; F01D 17/165; F01D 9/026; F01D 25/24

USPC .......................................... 415/203, 204, 205
See application file for complete search history.

(56) References Cited

U.S. PATENT DOCUMENTS 7,280,950 B2 * 10/2007 Heilenbach et al. .............. 703/7
2003/0206798 A1 11/2003 Allmang et al.
(Continued)

FOREIGN PATENT DOCUMENTS

DE 10 2004 039 477 A1 2/2006
EP 1 357 278 A2 10/2003
(Continued)

OTHER PUBLICATIONS

Notice of Allowance dated Sep. 5, 2013 issued in corresponding Korean Application No. 10-2011-7031317 with English translation.
(Continued)

*Primary Examiner* — Dwayne J White
*Assistant Examiner* — Jason Fountain
(74) *Attorney, Agent, or Firm* — Birch, Stewart, Kolasch & Birch, LLP

(57) ABSTRACT

A sheet-metal turbine housing has a scroll part formed by joining opposing scroll members of sheet metal to form a spiral-shaped exhaust gas passage. The housing includes a member on a side of a bearing housing inclosing a bearing supporting a rotation shaft of a turbine rotor blade member on the exhaust side forms an outer side of the turbine rotor blade. Support columns connect the member on the side of the bearing housing with the member on the exhaust side in an axial direction of the turbine and are arranged at intervals on an outer circumference of the turbine. Each support columns may have a cross-sectional shape which includes an upstream corner and a downstream corner in a direction of a gas flow, each of which has an acute angle, so that an upstream surface and a downstream surface are inclined to the gas flow.

18 Claims, 5 Drawing Sheets

(51) Int. Cl.
  *F01D 25/24* (2006.01)
  *F01D 9/02* (2006.01)
  *F01D 17/16* (2006.01)

(56) References Cited

U.S. PATENT DOCUMENTS

2004/0253097 A1* 12/2004 Kao .................. 415/204
2006/0133931 A1*  6/2006 Burmester et al. ........... 415/204
2009/0220335 A1*  9/2009 Matsuo et al. ........... 415/164

FOREIGN PATENT DOCUMENTS

| EP | 2 096 264 A2 | 9/2009 |
| GB | 2 035 467 A | 6/1980 |
| JP | 2003-314290 A | 11/2003 |
| JP | 2003-536009 A | 12/2003 |
| JP | 2008-106667 * | 10/2006 ............. F02B 39/00 |
| JP | 2006-527322 A | 11/2006 |
| JP | 2008-057448 A | 3/2008 |
| JP | 2008-106667 A | 5/2008 |
| JP | 2009-209701 A | 9/2009 |
| WO | WO 2007/135449 A1 | 11/2007 |
| WO | WO 2009/065881 A1 | 5/2009 |

OTHER PUBLICATIONS

Japanese Notice of Allowance dated Aug. 6, 2013 for Japanese Application No. 2009-289414 with English translation.
European Search Report dated Jun. 11, 2014 issued in corresponding EP Application No. 10839268.9.
Chinese Decision to Grant, issued Mar. 2, 2015, for Chinese Application No. 201080029321.4, along with an English translation.

* cited by examiner

FIG. 3
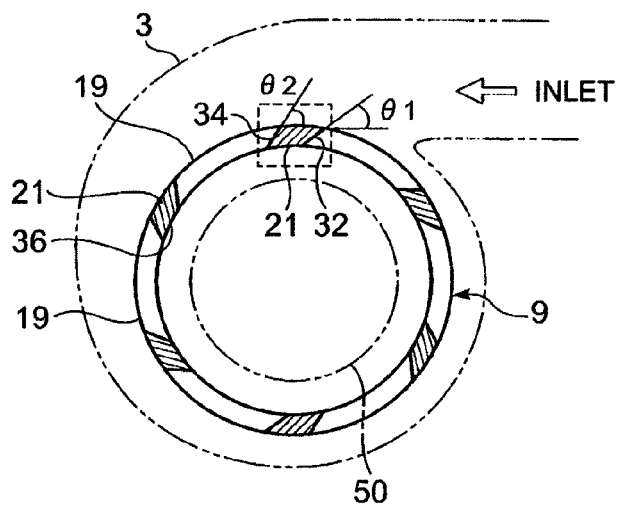
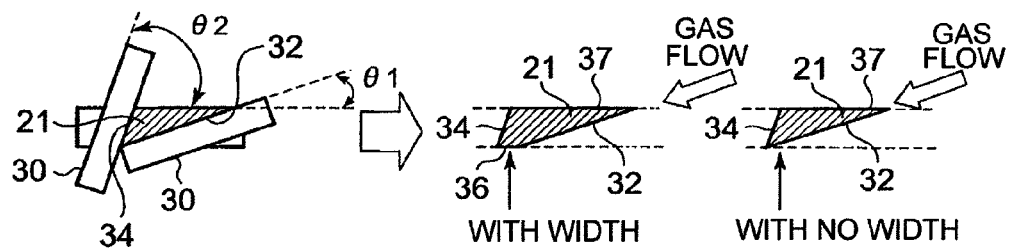
FIG. 4A  FIG. 4B  FIG. 4C
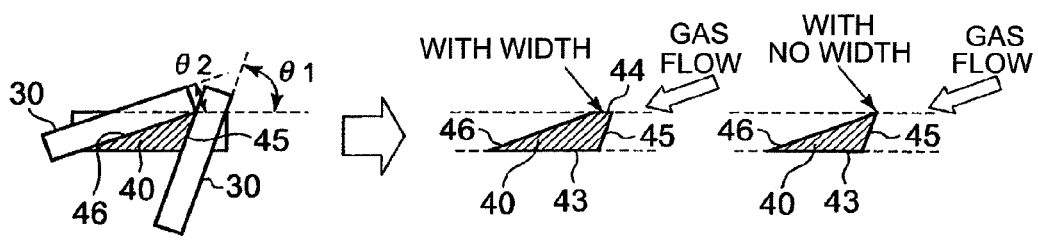
FIG. 5A  FIG. 5B  FIG. 5C

TURBINE HOUSING

TECHNICAL FIELD

The present invention relates to a sheet-metal turbine housing used for a turbocharger which generates a supercharging pressure with respect to an engine with use of energy of exhaust gas of the engine, in particular, to a structure of a support column provided on a side of a bearing stand constituting a core part of a turbine housing to a member on a side of an exhaust flange.

BACKGROUND ART

The turbine housing has a high heat capacity. Arranging such turbine housing on an upstream side of an exhaust-gas purification catalyst can interfere with warming the catalyst. In view of a recent trend of a tighter control on exhaust emission, it is important to reduce heat capacity by making the housing from a sheet metal to achieve a thinner and lighter housing so as to improve catalyst purification capability with activated catalyst.

In the case of the sheet-metal turbine housing, the sheet-metal part is thin and has low strength. Thus, it is necessary to provide support columns between a member on the side of the bearing housing in which the bearing is provided to support a rotation shaft of a turbine rotor blade and a member on a gas exhaust side so as to link and fix the members to each other. However, the support columns are arranged transversely across a flow path of the exhaust gas on an outer peripheral side of the turbine rotor blade. The support columns interrupt the gas flow, which leads to decrease in efficiency and a performance of a supercharger.

Patent Literature, JP2006-527322A discloses a spacer 01. As shown in FIG. 11, an exhaust gas turbine 02 is configured such that inside a housing 04 having a scroll shape and covered by an outer shell 03, a bearing ring 05 for an adjustable guide vane and a molded casing 07 are linked by the spacer 02 provided therebetween. The spacer 01 is arranged transversely across a flow path 09 of the gas into the turbine rotor blade in a radial direction.

Another sheet-metal turbine housing as a related technique is disclosed in Patent Literature 2, JP2008-57448A and Patent Literature 3, JP2003-536009A.

CITATION LIST

Patent Literature

[PTL 1]
JP2006-527322A
[PTL 2]
JP2008-57448A
[PTL 3]
JP2003-536009A

SUMMARY OF INVENTION

Technical Problem

Patent Literature 1 does not disclose a configuration of the spacer 01 in a circumferential direction or a cross sectional shape of the spacer 01 with respect to the exhaust gas streaming in the gas passage.

Patent Literatures 2 and 3 propose that the scroll part of the sheet-metal turbine housing consists of a pair of sheet-metal members that are abutted on each other and welded together in the circumferential direction to form the scroll part. However, Patent Literatures 2 and 3 fail to disclose a configuration of the core part which forms a core side of the scroll part, particularly a support column connecting a member on a flow exhaust side and a member on a side of the bearing housing in which the bearing supporting the rotation shaft of the turbine rotor blade is provided.

The support columns are arranged on an outer circumferential side of the turbine rotor and transversely across the passage of the gas entering the turbine rotor blade. To reduce flow resistance, it is desirable to minimize a width of the support columns. However, from a viewpoint of coupling and fixing the member on the bearing housing side and the member on the gas exhaust side, the support columns must have a certain level of strength.

Further, the support columns disposed in the circumferential direction causes pressure variation of an intake gas in the circumferential direction. This produces an exciting force. The exciting force resonates with a natural vibration of the turbine rotor blade, which may cause issues in an aspect of reliability of the turbine rotor blade. Therefore, it is necessary to set intervals, the number, cross-sectional shape of the support columns to prevent a certain exciting force from increasing.

In view of the above issues, an object of the present invention, in a support column which integrally connects the member on the side of the bearing housing in which a bearing supporting the rotation shaft of the turbine rotor blade is provided, and a member on the gas exhaust side transversely across the gas passage on an outer circumferential side of the turbine rotor blade, is to enhance intake characteristics by reducing the flow resistance and also to improve durability and reliability of the turbine rotor blade by avoiding resonance of the turbine rotor blade.

Solution to Problem

To solve the above issues, the present invention provides a sheet-metal turbine housing in which a scroll part is formed by joining opposing scroll members made of sheet metal to form a spiral-shaped exhaust gas passage therein. The sheet-metal turbine housing may include, but is not limited to:

a member on a side of a bearing housing in which a bearing supporting a rotation shaft of a turbine rotor blade is arranged;

a member on a flow exhaust side which forms an outer side of the turbine rotor blade in a direction of the turbine; and a plurality of support columns which connect the member on the side of the bearing housing with the member on the flow exhaust side in an axial direction of the turbine and which are arranged at intervals on an outer circumferential side of the turbine rotor in a circumferential direction of the turbine rotor blade.

A first aspect of the present invention is that each of the support columns has a cross-sectional shape in the axial direction of the turbine which includes an upstream corner and a downstream corner in a direction of a gas flow each of which has an acute angle so that an upstream surface and a downstream surface incline along the gas flow.

According to the first aspect of the present invention, the member on the side of the bearing housing where the bearing supporting the rotation shaft and the member on the flow exhaust side which forms the outer side of the turbine rotor blade are connected by the support columns in the direction of the turbine and each of the support columns has a cross-sectional shape in the axial direction of the turbine which includes an upstream corner and a downstream corner in a direction of the gas flow each of which has an acute angle so that an upstream surface and a downstream surface incline along the gas flow. Therefore, with respect to the gas flow whirling in the scroll part toward the center, the profile areas of the upstream surface and the downstream surface can be reduced. By this, it is possible to reduce flow resistance against the gas flow caused by the support columns and also to reduce generation of the wake (flow distortion) generated on a downstream side of the support columns. As a result, efficiency of the turbine rotor blade and reliability can be improved by resolving flow distortion on the downstream side of the support columns.

The cross-sectional area of the support column is set such to secure stiffness and strength for connecting the member on the side of the bearing housing and the member on the flow exhaust side and also maintaining a clearance between the support columns and the turbine rotor blade.

In the above sheet-metal turbine housing, each of the support columns may have a cross-sectional shape which includes an upstream corner and a downstream corner each having an angle of 20° to 70°. By setting the angle of the upstream corner and the downstream to an acute angle, it is possible to secure the cross-sectional area of the support column and also to reduce the pressure loss of the gas flow.

In the above sheet-metal turbine housing, each of the support columns may have a cross-sectional shape of substantially quadrilateral formed by an inner arc, an outer arc, an upstream surface and a downstream surface, or of substantially triangle in which one of the inner and outer arcs has no width.

In this manner, each of the upstream surface and the downstream surface of the support column is configured flat and the support column has a cross-sectional shape of substantially quadrilateral or substantially triangle. Thus, it is easy to cut out and remove portions between the support columns other than portions constituting the support columns by machining an annular connection member. As a result, manufacturing and processing of the support columns becomes easier and at lower cost.

A second aspect of the present invention is that, in addition to the above substance (the sheet-metal turbine housing in which a scroll part is formed by joining opposing scroll members made of sheet metal to form a spiral-shaped exhaust gas passage therein. The sheet-metal turbine housing may include, but is not limited to: a member on a side of a bearing housing in which a bearing supporting a rotation shaft of a turbine rotor blade is arranged; a member on a flow exhaust side which forms an outer side of the turbine rotor blade in a direction of the turbine; and a plurality of support columns which connect the member on the side of the bearing housing with the member on the flow exhaust side in an axial direction of the turbine and which are arranged at intervals on an outer circumferential side of the turbine rotor in a circumferential direction of the turbine rotor blade), a number of the support columns is set so that an exciting force produced due to pressure variation of an intake gas in a circumferential direction caused by the support columns resonates with a first-order mode of a natural vibration of the turbine rotor blade at a low rotation speed side of an operation range, and resonates with not lower than a second-order mode of the natural vibration of the turbine rotor blade at a rotation speed outside of the operating range.

According to the second aspect of the present invention, the number of the support columns is set so that the exciting force produced due to pressure variation of the intake gas in the circumferential direction caused by the support columns resonates with the first-order mode of the natural vibration of the turbine rotor blade at the low rotation speed side of the operation range. Thus, it is possible to reduce the resonant stress by preventing a first-order mode resonant stress of the turbine rotor blade from increasing excessively, thereby reducing the resonant stress.

Normally, the resonance in a low-order mode generates high resonant stress. Thus, a resonance point is disposed toward the low rotation speed side to positively avoid the resonance in the low-order mode. As a result, the dynamic stress acting on the turbine rotor blade can be minimized.

Further, the number of the supporting columns is set so that the exciting force resonates with not lower than the second-order mode of the natural vibration of the turbine rotor blade at the rotation speed outside of the operating range. Thus, it is possible to avoid the resonance with not lower than the second-order mode of the turbine rotor blade within the operating range, thereby improving reliability of the turbine rotor blade.

In the above sheet-metal turbine housing, the number of the support columns is set preferably 6 to 12. The number of the support columns is set based on evaluation of a Campbell diagram drawn by analyzing shaking test results. An example of the Campbell diagram is shown in FIG. 10. Based on characteristics of the diagram, it is adequate that the harmonic order H is 6 to 12.

The harmonic order H is a ratio of a frequency of an excited vibration produced depending on the number of the support columns to a rotation speed of the turbine rotor blade. For instance, when the number of the support columns is 5, the relationship between the rotation speed and the frequency is determined by a harmonics line 5H and the intersection of the harmonics line 5H and the natural frequency (the first-order mode) of the turbine rotor blade is a resonance point, K1.

At the first-order natural frequency, the harmonics line 6H and above is selected so that the resonance occurs at a comparatively low speed. The intersection of the harmonics line and the natural frequency of the second-order mode or lower should be outside the operating range. Thus, the harmonic order is set not higher than the harmonics line 10H. In the second-order mode, it is confirmed from the analysis of the shaking test results that the resonant stress on the turbine rotor blade 50 is smaller than in the first-order mode and the third-order mode and thus it is preferable to select the harmonics order not higher than 12H to avoid resonance in the third-order mode.

Therefore, the harmonics line is set not lower than 6H to resonate with the first-order natural frequency at a low rotation speed and not higher than 12H to resonate with the third-order natural frequency outside of the operating range.

In the first and second aspects of the present invention, the support columns may be arranged at irregular intervals in the circumferential direction. By arranging the support columns at irregular intervals, it is possible to prevent increase of the exciting force at a certain frequency and to avoid excessive increase of a resonant stress caused by resonating with the turbine rotor blade.

In the first and second aspects of the present invention, one of the support columns may be arranged in an immediate downstream of a tongue part constituting an end of the scroll part.

By arranging the one of the support columns in the immediate downstream of the tongue part, the exhaust gas exiting from the tongue part is immediately blocked its flow by the one of the support columns from streaming toward the center. This resolves the flow distortion at a merging point of the flow having streamed through the scroll part of the turbine housing and the flow toward the immediate downstream of the tongue part.

By enhancing the flow along the turbine housing, the flow distortion near the tongue part is resolved and efficiency drop of the turbine rotor blade can be suppressed.

Advantageous Effects of Invention

According to the first aspect of the present invention, the member on the side of the bearing housing where the bearing supporting the rotation shaft and the member on the flow exhaust side which forms the outer side of the turbine rotor blade are connected by the support columns in the direction of the turbine and each of the support columns has a cross-sectional shape in the axial direction of the turbine which includes an upstream corner and a downstream corner in a direction of the gas flow each of which has an acute angle so that an upstream surface and a downstream surface incline along the gas flow. Therefore, with respect to the gas flow whirling in the scroll part toward the center, the profile areas of the upstream surface and the downstream surface can be reduced. By this, it is possible to reduce flow resistance against the gas flow caused by the support columns and also to reduce generation of the wake (flow distortion) generated on a downstream side of the support columns. As a result, efficiency of the turbine rotor blade and reliability can be improved by resolving flow distortion on the downstream side of the support columns.

According to the second aspect of the present invention, the number of the support columns is set so that the exciting force produced due to pressure variation of the intake gas in the circumferential direction caused by the support columns resonates with the first-order mode of the natural vibration of the turbine rotor blade at the low rotation speed side of the operation range. Thus, it is possible to reduce the resonant stress by preventing a first-order mode resonant stress of the turbine rotor blade from increasing excessively.

Further, the number of the supporting columns is set so that the exciting force resonates with not lower than the second-order mode of the natural vibration of the turbine rotor blade at the rotation speed outside of the operating range. Thus, it is possible to avoid the resonance with not lower than the second-order mode of the turbine rotor blade within the operating range, thereby improving reliability of the turbine rotor blade.

BRIEF DESCRIPTION OF DRAWINGS

FIG. 3 is a cross-sectional diagram illustrating support columns.

FIG. 4A shows an arrangement of a cutting tool cutting the support column. FIG. 4B shows a cross-sectional shape of the support column which is approximately quadrilateral with an inner arc. FIG. 4C shows a cross-sectional shape of the support column which is approximately triangle without an inner arc.

FIG. 5A to FIG. 5C correspond to FIG. 4A to FIG. 4C and illustrate a second preferred embodiment.

DESCRIPTION OF EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present invention.

First Preferred Embodiment

A turbine housing in relation to a first preferred embodiment of the present invention is explained in reference to FIG. 1 through FIG. 4.

Figure 1:
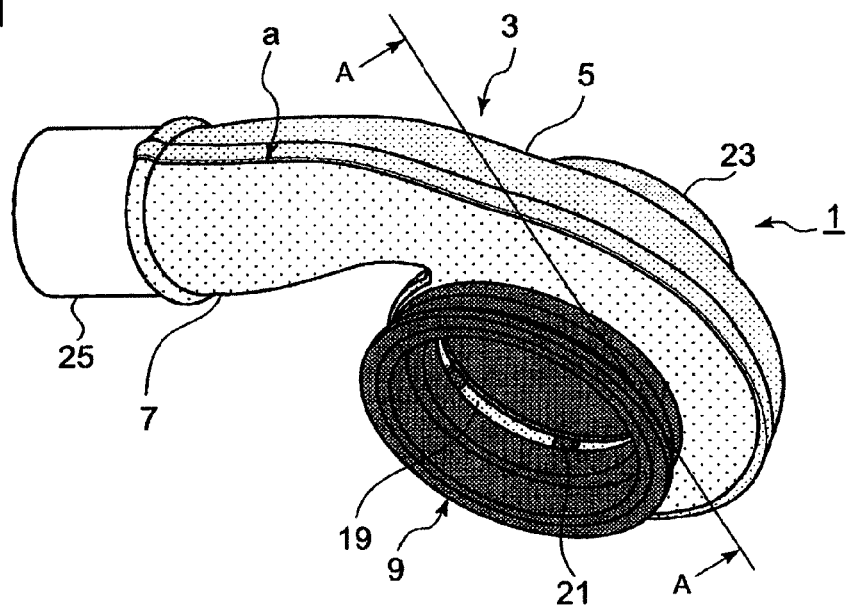
FIG. 1 is a perspective view showing a general structure of a turbine housing in relation to a first preferred embodiment of the present invention.
Figure 2:
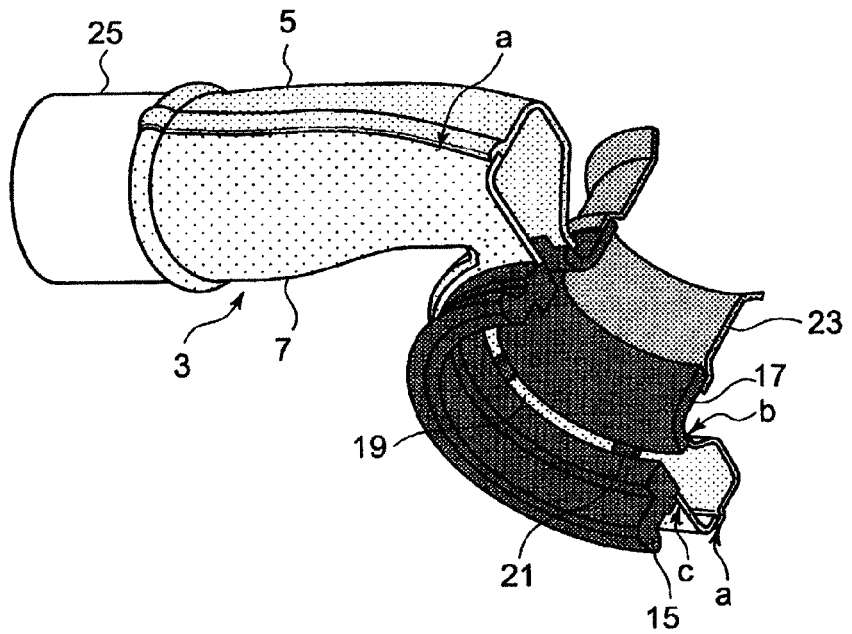
FIG. 2 is a cross-sectional view of a main section of the turbine housing taken along a line A-A of FIG. 1.

As shown in FIG. 1 and FIG. 2, the turbine housing 1 made of sheet metal is essentially formed of a scroll part 3, a center core part 9 and an outlet tube part 23. The scroll part 3 is formed of a first scroll part 5 and a second scroll part 7 that face each other. The turbine housing 1 is formed by welding the four parts together.

The scroll part 3 is formed by butt-welding the first scroll part 5 and the second scroll part 7 together to form a spiral-shaped gas passage. Each of the first and second scroll parts 5 and 7 has a cross-sectional shape that is approximately a halved portion of the gas passage.

The center core part 9 is arranged at a rotation center of the scroll part 3. The center core part 9 has approximately a cylindrical shape. The center core part 9 includes a bearing housing portion 15 where a bearing is arranged to support a rotation shaft of the turbine rotor blade 50 (see FIG. 3), and a passage outlet portion 17 which forms an outlet side of the gas. Between the bearing housing portion 15 and the passage outlet portion 17, a plurality of support columns 21 are provided.

The support columns 21 are provided circumferentially at irregular intervals outside of the turbine rotor blade 50 to join the bearing housing portion 15 and the passage outlet portion 17.

The support columns 21 are made of material which has strength and heat resistance to maintain a constant clearance between the turbine rotor blade 50 and an inner surface of the center core part 9 by connecting the bearing housing portion 15 and the passage outlet portion 17.

To a front edge of the passage outlet portion 17, the outlet tube part 23 of a pipe shape is connected by welding all around the outlet tube part 23.

The first scroll part 5 and the second scroll part 7 are formed by forming a thin sheet metal (about 1 to 3 mm thick). The spiral gas passage is formed by abutting an edge of the first scroll part 5 and an edge of the second scroll part 7 to each other. As shown in FIG. 2, tips of the first and second scroll parts 5 and 7 overlap and are joined by one-side welding from the outside of the overlapped tip, thereby forming a weld zone a over the entire circumference of the spiral scroll part 3.

Alternatively, instead of one-side welding, the tips of the formed sheet metal may be abutted to each other and welded by butt-welding. The sheet metal may be made of heat-resistant steel such as austenitic steel and stainless steel.

Each of the first scroll part 5 and the second scroll part 7 has other edge on a side of the center core part 9. The other edges of the first and second scroll parts 5 and 7 are welded together along the outer circumference of the bearing housing portion 15 and the passage outlet portion 17 to form a weld zone b on the outer circumference of the passage outlet portion 17 and form a weld zone c on the outer circumference of the bearing housing portion 15.

The bearing housing portion 15, the passage outlet portion 17 and the support columns 21 connecting the portions 15 and 17 have an integral structure. The bearing housing portion 15, the passage outlet portion 17 and the support columns 2 are formed as a single unit by cutting work. In the similar manner, the outlet tube part 23 is cut out as well.

A processing method and a cross-sectional shape of the support columns 21 provided in the above turbine housing 1 is now described.

FIG. 3 shows a cross-sectional view of a plurality of columns 21 disposed in a circumferential direction taken in the axial direction of a turbine. The support columns 21 are formed by machining the center core part 9 (see FIG. 2) that is substantially cylindrical and that has the bearing housing portion 15 and the passage outlet portion 17. For instance, the center core part 9 is processed by cutting work to leave the portions constituting the support columns 21 and cut out portions between the support columns 21. The passages 19 are formed in places where the portions are cut out between the support columns 21.

The processing of each of the support columns 21 is performed by means of a cutting tool 30 as shown in FIG. 4A. The cutting tool 30 is placed against an upstream surface 32 of the support column 21 in cross-section to form a flat surface with an angle of $\theta 1$, whereas the cutting tool 30 is placed against a downstream surface 34 of the support column 21 in cross-section to form a flat surface with an angle of $\theta 2$. As an example, the upstream angle $\theta 1$ is approximately 20°, whereas the downstream angle $\theta 2$ is approximately 70°. The upstream surface 32 and the downstream surface 34 are processed into flat surfaces to facilitate the machining.

When the upstream angle $\theta 1$ is below 20°, the cross-sectional shape of the support column is too flat and the area of the passage 19 formed between the pair of adjacent support columns 21 must be reduced to secure a sectional area corresponding to a required strength. In contrast, when the upstream angle $\theta 1$ exceeds 70°, it is difficult to reduce a profile area of the support column 21 with respect to the direction of the gas flow and thus, it is difficult to reduce loss of the gas flow and also to reduce generation of the wake (flow distortion) by means of the support columns. Therefore, the upstream angle $\theta 1$ is preferable set acute, 20° to 70°. The downstream angle $\theta 2$ may be set in the similar manner.

FIG. 4B shows a cross-sectional shape of the support columns 21 each having an inner arc 36, an outer arc 37, the upstream surface 32 and the downstream surface 34 that is approximately quadrilateral in cross-section as a whole. When the support column 21 is processed without the inner arc 36 as shown in FIG. 4C, the outer arc 37, the upstream surface 32 and the downstream surface 34 form approximately triangle in cross-section as a whole. By processing the support columns 21 in the above manner, the cross-sectional shape that is approximately quadrilateral or triangle has the upstream angle $\theta 1$ and the downstream angle $\theta 2$ such that both the upstream surface 32 and the downstream surface 34 incline along the gas flow.

In this manner, each of the upstream surface 32 and the downstream surface 34 of the support column 21 is configured flat and the support column 21 as a whole has a cross-sectional shape of approximately quadrilateral or triangle. The portions constituting the support columns 21 are left and other portions between the support columns 21 are cut out and removed by machining the annular connection member, resulting in easier processing and manufacturing of the support columns 21.

The upstream and downstream angles $\theta 1$ and $\theta 2$ are set acute to form the upstream surface 32 and the downstream surface 34 to incline along the gas flow. With respect to the gas flow whirling in the scroll part 3 toward the center, the profile areas of the upstream-sides surface 32 and the downstream surface 34 can be reduced compared to a conventional rectangular cross-sectional shape and thus, it is possible to reduce loss of the gas flow and also to reduce generation of the wake (flow distortion) by means of the support columns 21.

Therefore, by securing such cross-sectional area having stiffness and strength enough to maintain a clearance between the support columns 21 and the turbine rotor blade and by forming the cross-sectional shape of the support columns 21 into the shape as described above, it is possible to reduce the pressure drop of the gas flow caused by the support columns 21 and to reduce flow distortion on a downstream side of the support columns 21. As a result, both efficiency and reliability of the turbine rotor blade can be improved.

Second Preferred Embodiment

Figure 7:
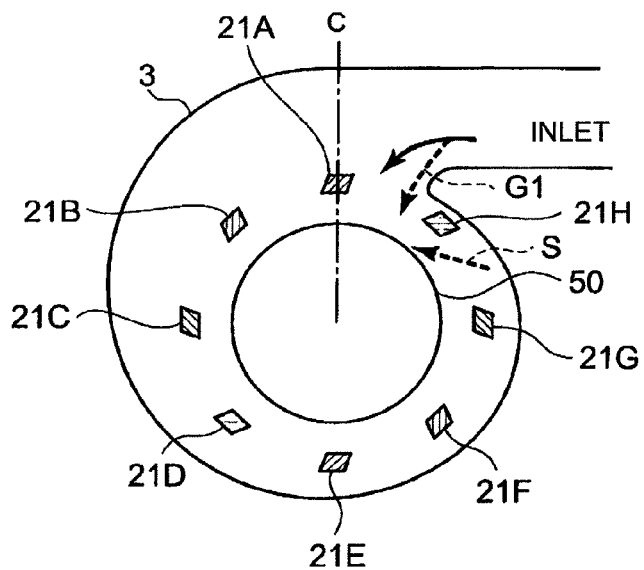
FIG. 7 illustrates a third preferred embodiment.

A support column 40 having a cross-sectional shape different from that of the first preferred embodiment is explained in reference to FIG. 7. As shown in FIG. 5A, the relationship between the upstream angle $\theta 1$ and the downstream angle $\theta 2$ of the first preferred embodiment is reversed in the second preferred embodiment. Specifically, the upstream surface 45 is formed into an inclined surface with the upward angle $\theta 1$ of approximately 70° and the downstream surface 46 is formed into an inclined surface with the downstream angle $\theta 2$ of approximately 20°. Each of the inclined surfaces is processed by using the cutting tool.

FIG. 5B shows a cross-sectional shape of the support column 40 having an outer arc 44. Each of the support columns 40 has an inner arc 43, the outer arc 44, an upstream surface 45 and a downstream surface 46 that form approximately quadrilateral in cross-section as a whole. When the support column 40 is processed without the outer arc 44 as shown in FIG. 5C, the outer arc 43, the upstream surface 45 and the downstream surface 46 form approximately triangle in cross-section as a whole. By processing the support columns 40 in the above manner, the cross-sectional shape that is approximately quadrilateral or triangle has the upstream angle $\theta 1$ and the downstream angle $\theta 2$ such that both the upstream surface 45 and the downstream surface 46 incline along the gas flow.

In the support column 40 processed as described above, the upstream and downstream angles $\theta 1$ and $\theta 2$ are set acute to form the upstream surface 45 and the downstream surface 46 to incline along the gas flow in a manner similar to the first preferred embodiment. With respect to the gas flow whirling in the scroll part 3 toward the center, the profile areas of the upstream surface 45 and the downstream surface 46 can be reduced and thus, it is possible to reduce loss of the gas flow and also to reduce generation of the wake (flow distortion) by means of the support columns 40. The profile area with respect to the direction of the gas flow is the same as that of the first preferred embodiment and thus, the second preferred embodiment has the same effects as the first preferred embodiment, which are reduction of the loss of the gas flow and reduction of generation of the wake (flow disturbance).

Third Preferred Embodiment

Figure 6:
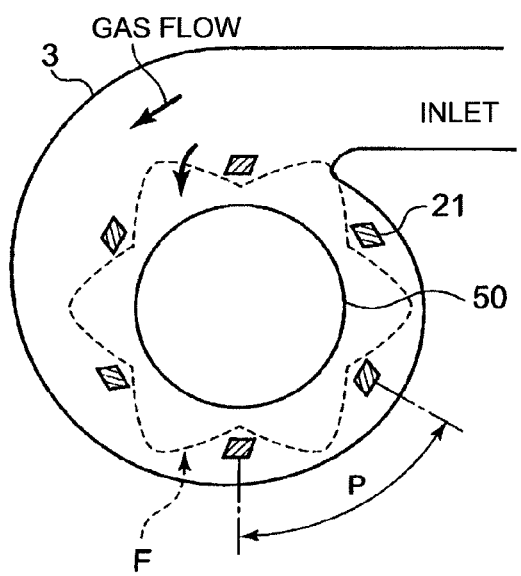
FIG. 6 illustrates the second preferred embodiment and is an explanatory drawing of resonance of a turbine rotor blade.
Figure 10:
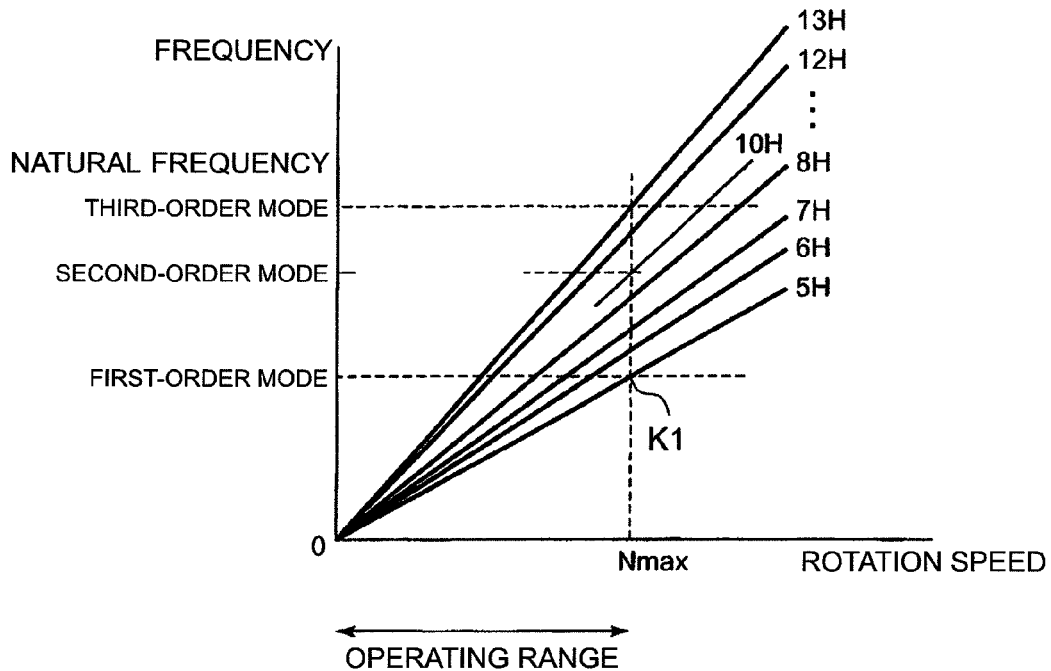
FIG. 10 is an explanatory graph showing a relationship between an exciting force by the support columns and the resonance of the turbine rotor blade.

A third preferred embodiment is described in reference to FIG. 6, FIG. 7 and FIG. 10.

In the third preferred embodiment, a method of setting a number of the support columns 21 is explained. The number of the support columns 21 is set so as to avoid the resonance of the turbine rotor blade 50.

As shown in FIG. 6, the support columns 21 are arranged at equal intervals P in the circumferential direction. The gas whirls in the scroll part 3 and then streams toward the center of the turbine rotor blade 50. Meanwhile, on the downstream side of the support columns 21, the wake (flow distortion) is produced, resulting in generating speed difference and pressure difference in the steam flow streaming toward the center of the turbine rotor blade 50 between a downstream position of the support column 21 and a position between the support columns 21. The pressure difference causes a pressure variation in the circumferential direction, thereby generating a pressure wave F indicated by a dashed line. When the exciting force acts toward the turbine rotor blade 50, there is a possibility that the frequency of the exciting force resonates with the natural frequency of the turbine rotor blade 50. In this manner, depending on the number of the support columns 21, the vibration caused by the pressure wave F in the circumferential direction resonates with the natural frequency of the turbine rotor blade 50, which is hereinafter described as a harmonic resonance.

As shown in FIG. 10, the vibration of the turbine rotor blade is analyzed and shown in a Campbell diagram. The diagram shows a frequency on a vertical axis and a rotation speed of the turbine rotor blade on a horizontal axis. The harmonic order H is shown by solid lines. The harmonics order H is a ratio of a frequency of an excited vibration produced depending on the number of the support columns to a rotation speed of the turbine rotor blade 50. For instance, when the number of the support columns is 5, the relationship between the rotation speed and the frequency is determined by a harmonics line 5H.

The operation range of the turbine rotor blade 50 is set up to Nmax and the lines representing the first-order natural frequency and the third-order natural frequency of the turbine rotor blade 50 are respectively set. The intersection of the harmonics line 5H and the natural frequency (the first-order natural frequency, the third-order natural frequency) of the turbine rotor blade 50 indicates a resonance point.

Normally, the resonance in a low-order mode generates high resonant stress. Thus, it is necessary to dispose the resonance point toward the low rotation speed side to positively avoid the resonance in the low-order mode. Therefore, it is adequate to select not lower than 6H so that the exciting force resonates with the first-order natural frequency at a rotation speed as low as possible.

Figure 11:
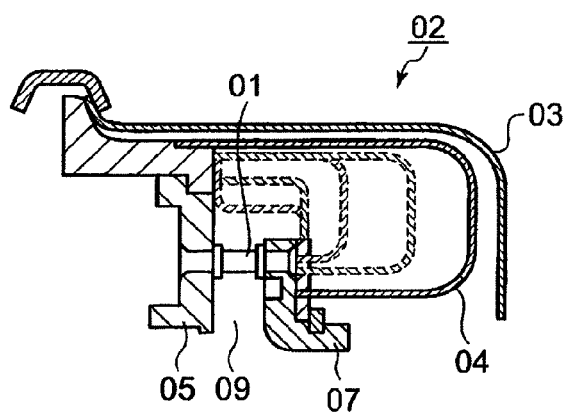
FIG. 11 is an illustrative drawing of a related art.

With the natural frequency of not lower than the second order mode, the exciting force preferably resonates at a rotation speed outside of the operating range. From the Campbell diagram of FIG. 11, the intersection of the harmonics line and the natural frequency of not lower than the second-order mode should be outside the operating range. Thus, the harmonic order is set not higher than 10H. In the second-order mode, based on the analysis of the shaking test results, the resonant stress on the turbine rotor blade 50 is smaller than in the first-order mode and the third-order and thus, it is preferable to select the harmonic order not higher than 12H to avoid resonance in the third-order mode.

Therefore, the harmonics line is set not lower than 6H to resonate with the first-order natural frequency at a low rotation speed and not higher than 12H to resonate with the third-order natural frequency outside of the operating range.

Figure 9:
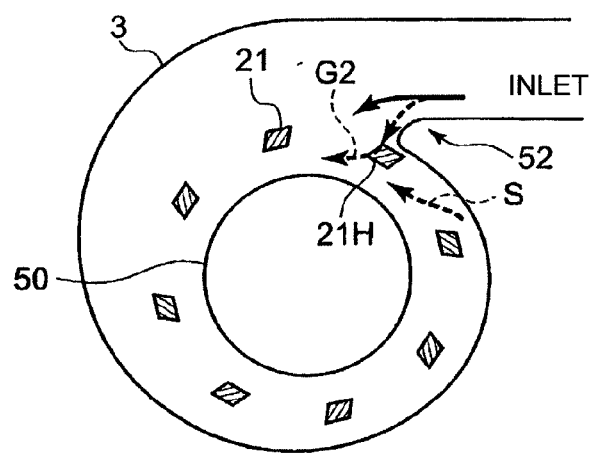
FIG. 9 illustrates a fifth preferred embodiment and is an explanatory drawing of the arrangement of the support columns in which at least one of the support columns is disposed on a downstream side of a tongue part.

The harmonic order H is preferably set 6 to 12 and the number of the support columns 21 is preferably set 6 to 12. For instance, an exemplary case of arranging eight support columns 21 is illustrated in FIG. 9. By arranging eight support columns 21 at equal intervals, it is possible to prevent the resonant stress of the turbine rotor blade 50 caused by to the harmonic resonance from increasing.

The diameter of an inner arc 36 of the support columns 21 is set not less than 1.15 of an outer diameter of the turbine rotor blade 50 so as to secure enough diffusion distance of the wake (flow distortion) generated on the downstream side of the support column 21 and to prevent the pressure wave F due to the pressure variation in the circumferential direction caused by the support columns 21 from entering a side of the turbine rotor blade 50, thereby further preventing generation of the harmonic resonance.

In the third preferred embodiment, the number of the support columns 21 is set so that the exciting force produced due to pressure variation of the intake gas in the circumferential direction caused by the support columns 21 resonates with the first-order mode of the natural vibration of the turbine rotor blade 50 at the low rotation speed side of the operation range. Thus, it is possible to reduce the resonant stress by preventing the first-order mode resonant stress of the turbine rotor blade from increasing excessively.

Further, the number of the supporting columns is set so that the exciting force resonates with the third-order mode of the natural vibration of the turbine rotor blade 50 at the rotation speed outside of the operating range. Thus, it is possible to avoid the resonance with the third-order mode of the turbine rotor blade 50 within the operating range, thereby improving reliability of the turbine rotor blade 50.

Fourth Preferred Embodiment

Figure 8:
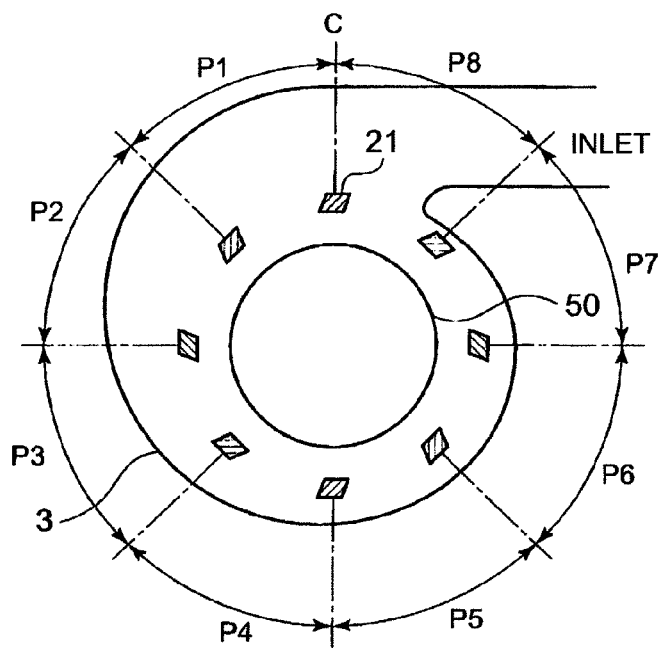
FIG. 8 illustrates a fourth preferred embodiment and is an explanatory drawing of the support columns disposed at irregular intervals.

A fourth preferred embodiment is described in reference to FIG. 8.

In the third preferred embodiment, the support columns 21 are arranged at equal intervals. In contrast, in the fourth preferred embodiment, the support columns 21 are arranged at irregular intervals. For instance, only one or all of the support columns 21 may be arranged at irregular intervals as indicated by P1 through P8 in FIG. 8.

By arranging the support columns 21 at irregular intervals, it is possible to prevent increase of the exciting force of a certain frequency and to avoid excessive increase of a resonant stress caused by resonating with the turbine rotor blade 50. By arranging all of the support columns 21 at different intervals, it is possible to positively and easily suppress generation of the exciting force of a certain frequency.

Fifth Preferred Embodiment

A fifth preferred embodiment is described in reference to FIG. 9.

In the fifth preferred embodiment, the support column 21 is arranged in an immediate downstream of a tongue part 52 constituting an end of the scroll part 3 as shown in FIG. 9.

In an exemplary case where eight support columns 21A to 21H are arranged at equal intervals (the support columns 21A to 21H being arranged in a counterclockwise direction from a center line C of the turbine rotor blade 50) as shown in FIG. 7, the support column 21A is arranged on the upstream side of the tongue part 52 in the gas flow. The gas exiting from the tongue part 52 flows in a direction of a gas flow G1 and then collides with a whirling flow S of the gas having streamed through the scroll part 3. This generates flow distortion at a merging point of the flow flowing in at the immediate downstream of the tongue part 52 and the whirling flow S.

However, by arranging the support column 21H at an immediate downstream of the tongue part 52, the gas streaming from the tongue part 52 is immediately blocked its flow by the support column 21H from streaming toward the center in a manner shown by the gas flow G2. In particular, by allowing the flow to stream along the downstream surface of the support column 21H and then along the whirling flow S streaming through the scroll part 3, it is possible to resolve the flow distortion at the merging point of the flow streaming in at the immediate downstream of the tongue part and the whirling flow S, thereby suppressing efficiency decline of the turbine rotor blade 50.

INDUSTRIAL APPLICABILITY

According to the present invention, in a support column which integrally connects the member on the side of the bearing housing in which a bearing supporting the rotation shaft of the turbine rotor blade is provided, and a member on the gas exhaust side transversely across the gas passage on an outer circumferential side of the turbine rotor blade, it is possible to enhance intake characteristics by reducing the flow resistance and also to improve durability and reliability of the turbine rotor blade by avoiding resonance of the turbine rotor blade. Therefore, the present invention is suitable for a turbine housing structure.

The invention claimed is:

1. A sheet-metal turbine housing in which a scroll part is formed by joining opposing scroll members made of sheet metal to form a spiral-shaped exhaust gas passage therein, the sheet-metal turbine housing comprising:
    a center core part which has approximately a cylindrical shape and which includes:
        a bearing housing portion in which a bearing for rotatably supporting a turbine rotor blade, of a turbine rotor, is arranged;
        a passage outlet portion configured to form an outer side of the turbine rotor blade in a direction of the turbine; and
        a plurality of support columns configured to connect the bearing housing portion with the passage outlet portion in an axial direction of the turbine and which are arranged at intervals on an outer circumferential side of the turbine rotor in a circumferential direction of the turbine rotor blade,
    wherein the center core part is formed from the bearing housing portion, the passage outlet portion, and the plurality of support columns as a single integral structure by cutting work,
    wherein each of the support columns has a cross-sectional shape of substantially quadrilateral formed by an inner arc, an outer arc, an upstream surface, and a downstream surface,
    wherein an upstream corner which is at a crossing of the outer arc and the upstream surface has an acute angle,
    wherein a downstream corner which is at a crossing of the inner arc and the downstream surface has an acute angle, and
    wherein each of the upstream surface and the downstream surface of the support column is configured flat and inclines from an outer periphery side of the scroll part toward an inner periphery side of the scroll part along a downstream direction of a gas flow.

2. The sheet-metal turbine housing according to claim 1, wherein each of the support columns has the cross-sectional shape which includes the upstream corner and the downstream corner each having an angle of 20° to 70°.

3. The sheet-metal turbine housing according to claim 1, wherein a number of the support columns is configured to be set so that an exciting force produced due to pressure variation of an intake gas in the circumferential direction caused by the support columns is configured to resonate with a first-order mode of a natural vibration of the turbine rotor blade at a low rotation speed side of an operation range, and resonate with not lower than a second-order mode of the natural vibration of the turbine rotor blade at a rotation speed outside of the operating range.

4. The sheet-metal turbine housing according to claim 1, wherein a number of the support columns is configured to be set 6 to 12.

5. The sheet-metal turbine housing according to claim 1, wherein the support columns are arranged at irregular intervals in the circumferential direction.

6. The sheet-metal turbine housing according to claim 1, wherein one of the support columns is arranged in an immediate downstream of a tongue part constituting an end of the scroll part.

7. A sheet-metal turbine housing in which a scroll part is formed by joining opposing scroll members made of sheet metal to form a spiral-shaped exhaust gas passage therein, the sheet-metal turbine housing comprising:
    a center core part which has approximately a cylindrical shape and which includes:
        a bearing housing portion in which a bearing for rotatably supporting a turbine rotor blade, of a turbine rotor, is arranged;
        a passage outlet portion configured to form an outer side of the turbine rotor blade in a direction of the turbine; and
        a plurality of support columns configured to connect the bearing housing portion with the passage outlet portion in an axial direction of the turbine and which are arranged at intervals on an outer circumferential side of the turbine rotor in a circumferential direction of the turbine rotor blade,
    wherein the center core part is formed from the bearing housing portion, the passage outlet portion, and the plurality of support columns as a single integral structure by cutting work,
    wherein each of the support columns has a cross-sectional shape of substantially triangular shape formed by an upstream surface a downstream surface, and an inner arc,
    wherein an upstream corner which is at a crossing of the upstream surface and the downstream surface has an acute angle,
    wherein a downstream corner which is at a crossing of the downstream surface and the inner arc has an acute angle, and
    wherein each of the upstream surface and the downstream surface of the support column is configured flat and inclines from an outer periphery side of the scroll part toward an inner periphery side of the scroll part along a downstream direction of a gas flow.

8. The sheet-metal turbine housing according to claim 7, wherein each of the support columns has the cross-sectional shape which includes the upstream corner and the downstream corner each having an angle of 20° to 70°.

9. The sheet-metal turbine housing according to claim 7, wherein a number of the support columns is configured to be set so that an exciting force produced due to pressure variation of an intake gas in the circumferential direction caused by the support columns is configured to resonate with a first-order mode of a natural vibration of the turbine rotor blade at a low rotation speed side of an operation range, and resonate with not lower than a second-order mode of the natural vibration of the turbine rotor blade at a rotation speed outside of the operating range.

10. The sheet-metal turbine housing according to claim 7, wherein a number of the support columns is configured to be set 6 to 12.

11. The sheet-metal turbine housing according to claim 7, wherein the support columns are arranged at irregular intervals in the circumferential direction.

12. The sheet-metal turbine housing according to claim 7, wherein one of the support columns is arranged in an immediate downstream of a tongue part constituting an end of the scroll part.

13. A sheet-metal turbine housing in which a scroll part is formed by joining opposing scroll members made of sheet metal to form a spiral-shaped exhaust gas passage therein, the sheet-metal turbine housing comprising:
   a center core part which has approximately a cylindrical shape and which includes:
      a bearing housing portion in which a bearing for rotatably supporting a turbine rotor blade, of a turbine rotor, is arranged;
      a passage outlet portion configured to form an outer side of the turbine rotor blade in a direction of the turbine; and
      a plurality of support columns configured to connect the bearing housing portion with the passage outlet portion in an axial direction of the turbine and which are arranged at intervals on an outer circumferential side of the turbine rotor in a circumferential direction of the turbine rotor blade,
   wherein the center core part is formed from the bearing housing portion, the passage outlet portion, and the plurality of support columns as a single integral structure by cutting work,
   wherein each of the support columns has a cross-sectional shape of substantially triangular shape formed by an upstream surface a downstream surface, and an inner arc,
   wherein an upstream corner which is at a crossing of the upstream surface and the outer arc has an acute angle,
   wherein a downstream corner which is at a crossing of the downstream surface and the downstream surface has an acute angle, and
   wherein each of the upstream surface and the downstream surface of the support column is configured flat and inclines from an outer periphery side of the scroll part toward an inner periphery side of the scroll part along a downstream direction of a gas flow.

14. The sheet-metal turbine housing according to claim 13, wherein each of the support columns has the cross-sectional shape which includes the upstream corner and the downstream corner each having an angle of 20° to 70°.

15. The sheet-metal turbine housing according to claim 13, wherein a number of the support columns is configured to be set so that an exciting force produced due to pressure variation of an intake gas in the circumferential direction caused by the support columns is configured to resonate with a first-order mode of a natural vibration of the turbine rotor blade at a low rotation speed side of an operation range, and resonate with not lower than a second-order mode of the natural vibration of the turbine rotor blade at a rotation speed outside of the operating range.

16. The sheet-metal turbine housing according to claim 13, wherein a number of the support columns is configured to be set 6 to 12.

17. The sheet-metal turbine housing according to claim 13, wherein the support columns are arranged at irregular intervals in the circumferential direction.

18. The sheet-metal turbine housing according to claim 13, wherein one of the support columns is arranged in an immediate downstream of a tongue part constituting an end of the scroll part.

* * * * *